United States Patent

[11] 3,550,579

[72] Inventor Ian P. S. Baker
   Liverpool, England
[21] Appl. No. 793,712
[22] Filed Jan. 24, 1969
[45] Patented Dec. 29, 1970
[73] Assignee United Gas Industries Limited
   London, England
   a British Company
[32] Priority Jan. 24, 1968
[33] Great Britain
[31] No. 3842/68

[54] FLUE SEAL FOR GAS APPLIANCE
   4 Claims, 2 Drawing Figs.
[52] U.S. Cl. .................................................. 126/307,
   126/85; 285/189, 285/347
[51] Int. Cl. ..................................................... F16l 5/02;
   F23j 11/02
[50] Field of Search ............................................ 126/85BX,
   110, 307, 314—319; 98/62; 285/189X, 339, 347X

[56] References Cited
   UNITED STATES PATENTS
| | | | |
|---|---|---|---|
| 2,550,187 | 4/1951 | Creed | 285/347X |
| 2,874,981 | 2/1959 | Brady | 285/339X |
| 3,052,230 | 9/1962 | Conrad | 126/307 |
| 3,428,040 | 2/1969 | Baker et al | 126/110 |

Primary Examiner—Charles J. Myhre
Attorney—Cushman, Darby & Cushman

ABSTRACT: The specification describes a seal for sealing a balanced flue of a gas appliance in a hole in a wall, in which the annular sealing member is tapered or stepped on its outer surface, has a cylindrical bore to match the flue at its narrow end, the bore at the wider end being outwardly stepped or tapered. When the flue with the seal thereon is pushed into the hole, with the narrower end of the sealing member leading, the sealing member deforms to seal tightly both into the hole and onto the flue.

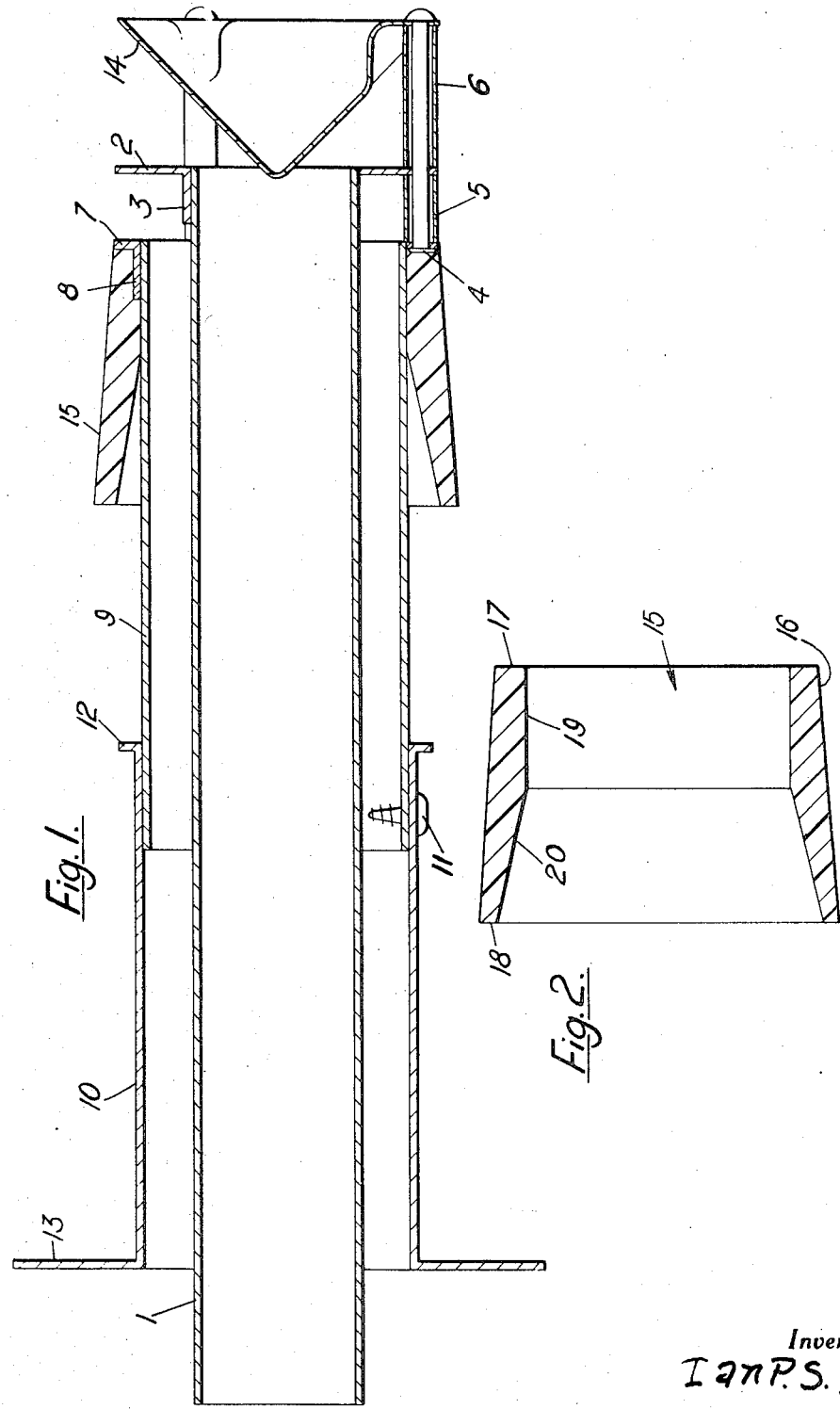

FLUE SEAL FOR GAS APPLIANCE

The present invention relates to sealing devices for sealing a cylindrical object in a hole in a wall.

Many instances arise in which it is desired to seal a cylindrical object in a hole in a wall. One example of this is illustrated in application Ser. No. 668468, now U.S. Pat. No. 3,428,040 in which a balanced flue pipe passes through the wall of a building to which the gas operated heater is connected. In application 668468 filed Sept. 18, 1967, now U.S. Pat. No. 3,428,040, there is described a method of sealing the balanced flue pipe, in which the concentric balanced flue is formed from a pair of telescopic tubes provided with outwardly extending flanges. Between these flanges are arranged resilient annular washers, telescoping of the two tubes causing axial compression of the washers, which are thereby expanded radially against the sides of the hole in which the balanced flue assembly is mounted.

The described arrangement is generally fairly rapid to install, but does require a number of steps on the part of the workman installing the balanced flue assembly.

According to the present invention there is provided a seal to provide a seal between a hole in a wall and a cylindrical object passing therethrough comprising an annular sealing member of resilient material having an outer surface which is tapered or stepped to provide a wider and a narrower end, and has a cylindrical inner bore at the narrower end and an outwardly tapered or stepped inner bore at the wider end.

With the sealing member of the invention, the narrower end may be inserted in the hole in the wall, while the wider end is too wide to be inserted in its unstressed state. By providing the tapered or stepped bore at the wider end, this wider end may be inwardly flexed to permit it to enter into the hole in the wall.

The thickness of the wall of the annular member at the wider end must be such as to prevent puckering on the outer cylindrical surface. If such puckering were to occur, the seal would become ineffective, since flue rain gas or air could permeate between the puckers or corrugations. With a seal of 2⅝ inches (6.66 cms) nominal outside diameter and a 2-inch (5.08 cms) inner diameter, for example the axial length of the seal may be 1.55 inches (3.94 cms), the outside diameter at the narrower end 2.425 inches (6.15 cms) and the outside diameter at the wider end 2.65 inches (6.73 cms). With such a seal, the wall thickness at the wider end should be 0.110 inches ± 0.030 inches (2.8 mms ± 0.076 mms).

In order that the invention may more readily be understood, the following description is given, merely by way of example, reference being made to the accompanying drawings, in which:

FIG. 1 is a schematic side elevation, in cross section, of a sealing arrangement according to the invention as applied to a concentric balance flue for a gas heater; and FIG. 2 is a dimensioned cross-sectional side elevation of the seal itself.

Referring to FIG. 1 there is illustrated an assembly for use in a balanced flue arrangement, for example similar to that described in application Ser. No. 668468 filed Sept. 18, 1967. now U.S. Pat. No. 3,428,040. This assembly comprises an inner tube 1, which serves as a flue or exhaust tube. At the right hand end, this tube is provided with an annular disc 2 which is secured to the tube 1 via lugs 3. Passing through the lugs 3 are three snap head rivets 4 equiangularly spaced with respect to one another, these rivets each having mounted thereon a short spacer 5 and a long spacer 6, the short spacer being to the left of the disc 2 and the long spacer to the right thereof.

The spacers 5 serve to hold a ring 7 at a distance from the disc 2, the ring 7 having leftwardly directed lugs 8 which serve to mount a first outer tube 9 coaxially on the inner tube 1. The first outer tube 9 in turn supports a second outer tube 10 which is telescopically received therearound, the axial position of the tube 10 relative to the tube 9 being determined by a self tapping screw 11. Tube 10 is formed with flanges 12 and 13 as illustrated.

The spaces 6 serve to position a conical deflector plate 14 from the disc 2. The arrangement described above is generally similar to that disclosed in Application Ser. No. 668,468, filed Sept. 18, 1967, now U.S. Pat. No. 3,428,040. However mounted on the first outer tube 9, is an annular seal 15 of the present invention. As can be seen in FIG. 2, the annular seal has a tapered outer surface 16 which tapers constantly from the narrow end 17 to the wider end 18. The internal diameter of the seal is constant over the portion 19 and is itself flared to the wider end 18, at 20. The seal is formed from a Neoprene rubber having a Shore Durometer hardness of 50. The seal is 1.55 inches (3.94 cms) long, having an internal cylindrical diameter of 2.00 inches (5.08 cms), an outside diameter at the narrow end of 2.45 inches (6.15 cms) and an outside diameter at the wider end of 2.65 inches (6.73 cms), the wall thickness at the wider end being 0.110 inches ± 0.030 inches (2.8 mms ± 0.076 mms).

In use of the assembly of FIG. 1, with the seal of FIG. 2 in position, the assembly is offered up to a 2.625 inch (6.66 cms) diameter hole in a wall, the deflector 14, disc 2, ring 7 and the narrow end 17 of the seal 15 passing easily into this hole. As the assembly is moved to the right in the drawing, the outer surface 16 of the seal 15, adjacent the wide end thereof, engages the hole so that the wider end of the seal is flexed radially inwardly, this elastic deformation ensuring a firm pressure between the outer surface 16 of the seal and the hole in the wall. The dimensions of the seal have been so chosen so that puckering during this elastic deformation will not occur.

The assembly can be inserted in the hole in the wall and the seal effected from the interior of the building, so that the arrangement is completed quickly.

An advantage of the seal of the invention is that the annular sealing member can be positioned on the cylindrical body at its place of manufacture, and delivered to its place of use in this form.

Instead of having the outer surface and a portion of the inner surface tapered, these could be stepped to provide a similar effect. Neoprene rubber has been chosen as a most suitable sealing material, but any other deformable material may be used in certain applications.

While the seal of the present invention has been described as for use with a coaxial balanced flue, it is contemplated that it may be used for sealing a flue arrangement of the type in which the exhaust gasses on the fire pass through a pipe extends through the wall of one location while the inlet gases pass through a pipe at a location spaced therefrom. Each of these two pipes would then be provided with such a seal. Similarly, the seal of the invention could be used for sealing any other cylindrical article such as a pipe carrying any service, in an aperture in a wall through which the pipe passes.

Although the seal of the present invention will usually be effected without axial compression of the annular sealing member, the sealing member may be compressed axially to provide a still firmer seal if the arrangement of our Application Ser. No. 668,468 filed Sept. 18, 1967, U.S. Pat. No. 3,428,040 is used with the tapered sealing member of this invention. Thus, the tubes 9 and 10 can slide relative to one another, and the flange 12 can be used to compress the seal, the tubes subsequently being locked.

I claim:

1. A seal to provide a seal between a hole in a wall and a rigid cylindrical object passing therethrough, said seal comprising, in combination:
   a. an annular sealing member of resilient material;
   b. a tapered or stepped outer surface to said member, providing a wider end and a narrower end to said member;
   c. said sealing member defining a cylindrical inner bore at said narrower end; and
   d. said sealing member further defining an outwardly tapered or stepped inner bore at said wider end.

2. A seal as claimed in claim 1, wherein said sealing member is of Neoprene.

3. For a gas appliance, a flue assembly comprising a rigid coaxial balanced flue, a seal around said flue, said seal comprising, in combination:
   a. an annular sealing member of resilient material;
   b. a tapered or stepped outer surface to said member, providing a wider end and a narrower end to said member;
   c. said sealing member defining a cylindrical inner bore at said narrower end; and
   d. said sealing member further defining an outwardly tapered or stepped inner bore at said wider end.

4. A flue assembly as claimed in claim 3, wherein said coaxial balanced flue comprises two telescoping cylinders, and a radially extending flange on each of said cylinders, and wherein said sealing member is positioned between said flanges, whereby telescoping of said cylinders results in compression of said sealing member by said flanges, effective to cause said sealing member to deform radially and provide a still firmer seal.